(12) United States Patent
Barnett

(10) Patent No.: US 7,210,371 B2
(45) Date of Patent: May 1, 2007

(54) CONTROL LEVER ASSEMBLY

(76) Inventor: Robert L. Barnett, 2090 Meyer Pl., Costa Mesa, CA (US) 92627

( * ) Notice: Subject to any disclaimer, the term of this patent is extended or adjusted under 35 U.S.C. 154(b) by 245 days.

(21) Appl. No.: 10/749,100

(22) Filed: Dec. 30, 2003

(65) Prior Publication Data

US 2005/0145059 A1    Jul. 7, 2005

(51) Int. Cl.
*F16C 1/10*    (2006.01)
(52) U.S. Cl. ................................... 74/502.2
(58) Field of Classification Search ............. 74/500.5, 74/501.5 R, 501.6, 502.2, 519, 523
See application file for complete search history.

(56) References Cited

U.S. PATENT DOCUMENTS

| | | | | |
|---|---|---|---|---|
| 3,776,061 A | * | 12/1973 | Yoshigai | .................... 74/480 R |
| 3,861,234 A | | 1/1975 | Cristie | |
| 3,915,028 A | | 10/1975 | Kine | |
| 4,543,847 A | * | 10/1985 | Nagano | .................... 74/480 R |
| 4,560,049 A | * | 12/1985 | Uchibaba et al. | ......... 192/85 R |
| D283,886 S | | 5/1986 | Trapp | |
| 4,742,728 A | | 5/1988 | Nagano | |
| 5,385,070 A | | 1/1995 | Tseng | |
| 5,682,794 A | | 11/1997 | Shibata | |
| 6,161,448 A | * | 12/2000 | Wang | .................... 74/502.2 |
| 6,457,378 B2 | * | 10/2002 | Hatakoshi et al. | ............ 74/525 |
| 6,516,682 B2 | | 2/2003 | Brainard | |
| 6,578,445 B2 | * | 6/2003 | Barnett | .................... 74/502.2 |

OTHER PUBLICATIONS

Drawing and photographs of the "Hayes" bicycle lever assembly. Dated: Jul. 19, 2006.

* cited by examiner

*Primary Examiner*—Vicky A. Johnson
(74) *Attorney, Agent, or Firm*—Knobbe, Martens, Olson & Bear, LLP

(57) ABSTRACT

A control lever assembly suitable for use in connection with an offroad motorcycle. The lever assembly includes a control lever having a finger grip portion and a mount portion. A control lever support has a first flange and a second flange defining a space therebetween to receive the mounted portion of the control lever. The first flange defines a first surface and the second flange defines a second surface facing the first surface. The control lever support is configured to support the mount portion of the control lever between the first and second surfaces for rotation about a pivot axis. The control lever is supported for relative rotation by the control lever support at first and second points along the pivot axis, wherein a distance between the first and second points is greater than a distance between the first and second surfaces.

18 Claims, 4 Drawing Sheets

CONTROL LEVER ASSEMBLY

BACKGROUND OF THE INVENTION

1. Field of the Invention

The present invention relates generally to a control lever assembly for operating a control system of a vehicle. More specifically, the present invention relates to an improved control lever assembly including a control lever rotatably supported by a control lever support.

2. Description of the Related Art

Motorcycle control levers are commonly mounted to the motorcycle's handlebar to permit a rider to operate a control system of the motorcycle, such as a manual clutch system or a front brake system. Typically, the control lever is rotatably supported by a lever support, or perch, which is clamped to the handlebar at a position inward of a handgrip. The control lever rotates about a pivot axis to impart a pulling force on a bowden wire arrangement (or impart a pushing force on a hydraulic piston, if the control system is hydraulically actuated) and thereby operate the control system. Thus, rotational motion of the control lever is converted into linear movement of the bowden wire (or piston).

With reference to FIG. 1, an example of a prior art control lever mount arrangement is illustrated. The prior art mount arrangement includes a control lever support, or perch 1, which is configured to be connected to a handlebar of an associated vehicle (not shown). The perch 1, includes a pair of spaced apart flanges 2 that extend generally in a radial direction from the handlebar. A mount portion of a control lever 3 is received between the flanges 2. A pivot bolt 4 passes through aligned bores 5 of the flanges 2 and through an aperture 6 of the control lever 3. A nut 7 secures the pivot bolt 4 to the perch 1. In some arrangements, a bushing 8 may be positioned between the control lever 3 and the pivot bolt 4. Typically, the bushing 8 is fixed with respect to the control lever 3 and, thus, rotates with respect to the pivot bolt 4.

Thus, the control lever 3 is rotatable about a pivot axis $P_A$ defined by the pivot bolt 4. One problem with such an arrangement is that a space, or gap, often exists between the aperture 6 of the control lever 3 and an external surface of an adjacent portion of the pivot bolt 4. This gap may exist due to normal manufacturing variations or may be a result of other factors, such as the pivot bolt 4 and control lever 3 originating from different manufacturers. Similarly, a gap may exist between upper and lower surfaces of the control lever 3 and the flanges 2. Gaps in these two areas may permit significant undesired movement of the control lever 3, that is, movement in directions other than rotation about the pivot axis $P_A$.

Although the actual gap may be relatively small, the undesired movement is magnified at points along the control lever 3 away from the pivot axis $P_A$. Accordingly, at the finger grip portion of the control lever 3 (i.e., the portion grasped by the rider), the amount of undesired movement is often significant. This undesired movement, or play, may be a source of annoyance to a rider of the motorcycle and especially to motorcycle racers, who rely on the ability to precisely operate the various lever-actuated control systems of the motorcycle.

Another problem with the control lever mount arrangement of the type illustrated in FIG. 1 is that the performance of the lever may be affected by a pivot bolt 4 and/or nut 7 that is overly tightened. Over-tightening of the pivot bolt 4 and/or nut 7 may collapse the flanges 2 toward one another thereby causing contact between the inner surfaces of the flanges 2 and the adjacent, outer surfaces of the control lever 3. Under-tightening of the nut 7, however, may result in the nut 7 loosening due to vibrations transmitted to the control lever perch 1 by the engine of the vehicle.

SUMMARY OF THE INVENTION

Desirably, the preferred embodiments of the present control lever assembly provide smooth rotation of the control lever with reduced undesired movement in comparison to the prior art arrangement of FIG. 1. In addition, desirably, the preferred embodiments of the present control lever assembly provide consistent performance that is not adversely affected by over-tightening of its components during assembly.

A preferred embodiment involves a control lever assembly including a control lever support and a control lever. The control lever support is configured to be connectable to a handlebar assembly of an associated vehicle. The support has an upper flange and a lower flange defining a space therebetween. The upper flange defines an upper bore and the lower flange defines a lower bore. The upper bore and the lower bore are aligned with one another along a pivot axis of the control lever assembly. The control lever defines a finger grip portion and a mount portion. The mount portion defines an upper surface and a lower surface. A distance between the upper and lower surfaces is sized such that the mount portion is receivable within the space between the upper and lower flanges. The control lever also includes an upper shaft portion extending from the upper surface and a lower shaft portion extending from the lower surface. The upper shaft portion is supported within the upper bore and the lower shaft portion is supported within the lower bore when the lever is supported by the support.

A preferred embodiment involves a control lever assembly including a control lever support and a control lever. The control lever support is configured to be connectable to a handlebar assembly of an associated vehicle. The support has an upper flange and a lower flange defining a space therebetween. The upper flange defines an upper bore and the lower flange defines a lower bore. The control lever defines a finger grip portion and a mount portion. The mount portion is configured to be receivable within the space between the upper and lower flanges. The mount portion also defines an aperture extending therethrough. A pivot shaft extends through the aperture of the control lever and is rotationally fixed with respect to the control lever. The pivot shaft defines a pivot axis of the control lever and has an intermediate shaft portion, an upper shaft portion and a lower shaft portion. The intermediate shaft portion is positioned within the aperture. The upper shaft portion is supported within the upper bore and the lower shaft portion is supported within the lower bore when the control lever is supported by the support.

Yet another aspect of a preferred embodiment involves a control lever assembly including a control lever and a control lever support. The control lever has a finger grip portion and a mount portion. The control lever support has a first flange and a second flange defining a space therebetween. The first flange defines a first surface and the second flange defines a second surface facing the first surface. The support is configured to support the mount portion of the control lever within the space between the first and second flanges for rotation about a pivot axis. The control lever is supported for relative rotation by the support at first and second points along the pivot axis. A distance between the first and second points is greater than a distance between the first and second surfaces.

BRIEF DESCRIPTION OF THE DRAWINGS

These and other features, aspects and advantages of the present invention are described below with reference to drawings of a preferred embodiment, which is intended to illustrate but not to limit the present invention. The drawings comprise four figures.

DETAILED DESCRIPTION OF THE PREFERRED EMBODIMENT

Preferred embodiments of the control lever assembly find utility with a number of vehicle types, including, without limitation, motorcycles, bicycles, all-terrain vehicles (ATVs) and other types of vehicles where control levers may be employed. In addition, advantages present in the preferred embodiments may be realized with a number of different control lever functions, such as control levers configured for use with a manual clutch or braking system, for example. The control lever assembly of FIGS. 2–4, however, are particularly well-suited for use with a cable actuated, manual clutch lever of an off-road motorcycle.

Figure 2:
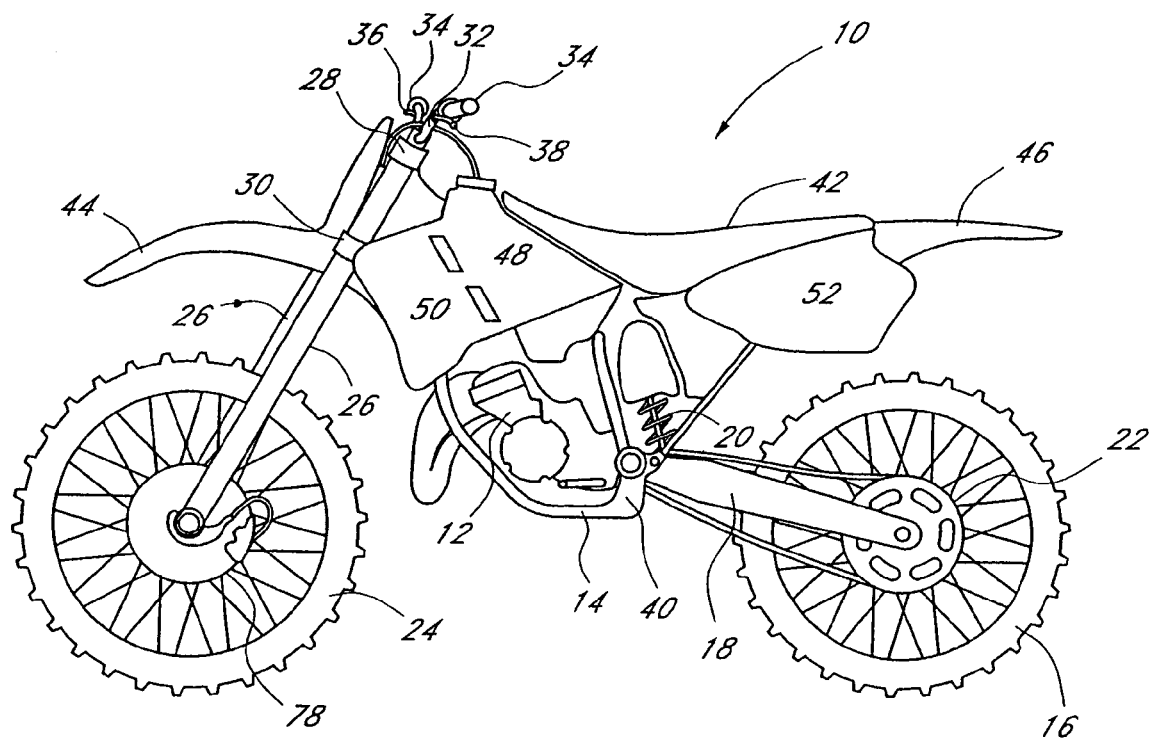
FIG. 2 is a side elevational view of an off-road motorcycle incorporating a control lever assembly having certain features, aspects and advantages of the present invention.

With reference to FIG. 2, an off-road motorcycle, generally referred to by the reference numeral 10, is shown. Preferably, an internal combustion engine 12 and associated transmission are mounted within a frame 14 of the motorcycle 10. A rear wheel 16 is connected to the frame through a rear suspension system comprised of a swingarm 18 and a rear shock absorber 20. Preferably, the rear wheel 16 is driven by the engine 12 through a chain and sprocket drive assembly 22. A front wheel 24 is connected to the frame 14 through a front suspension system comprised of a telescoping suspension fork 26 and upper and lower fork clamps 28, 30, respectively. The fork clamps 28, 30 are connected to a steering stem (not shown) that is supported for limited rotation about a steering axis defined by a head tube (not shown) of the frame 14, as is known in the art.

A handlebar 32 preferably is connected to the upper fork clamp 28 to permit a rider to steer the motorcycle 10. Preferably, each end of the handlebar 32 includes a handgrip 34 for the rider of the motorcycle 10 to grasp. The handlebar 32 also provides a location in which to mount a plurality of rider controls, preferably including a twist-type throttle assembly (not shown), a brake lever assembly 36, a clutch lever assembly 38, along with other controls that may be necessary or desired. A typical arrangement places the throttle and brake lever assembly 38 on the right side of the handlebar 32 (from the perspective of a rider seated on the motorcycle 10) and the clutch lever assembly 38 on the left side of the handlebar 32.

The motorcycle 10 also includes a pair of foot pegs 40, preferably mounted to a lower portion of each side of the frame 14, on which a rider of the motorcycle 10 may place his or her feet. An elongated, straddle type seat assembly 42 is provided for use when the rider is in a seated position. A plurality of body portions of the motorcycle 10 are provided, preferably including front and rear fenders 44, 46, a gas tank 48, a pair of radiator shrouds 50 (only one shown) and a pair of side panels 52 (only one shown).

Figure 3:
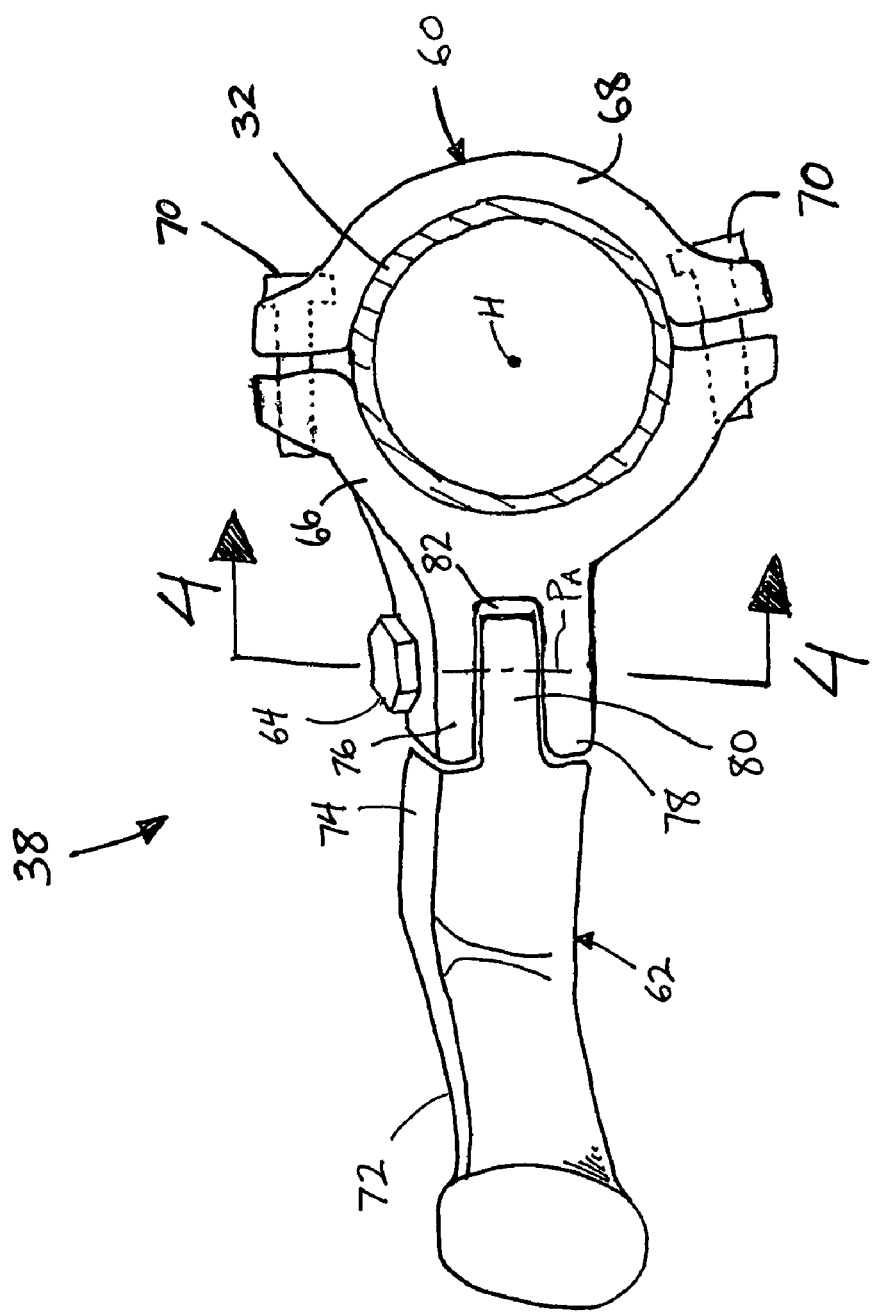
FIG. 3 is a side view of the control lever assembly of FIG. 2 as viewed along an axis of the handlebar assembly.
Figure 4:
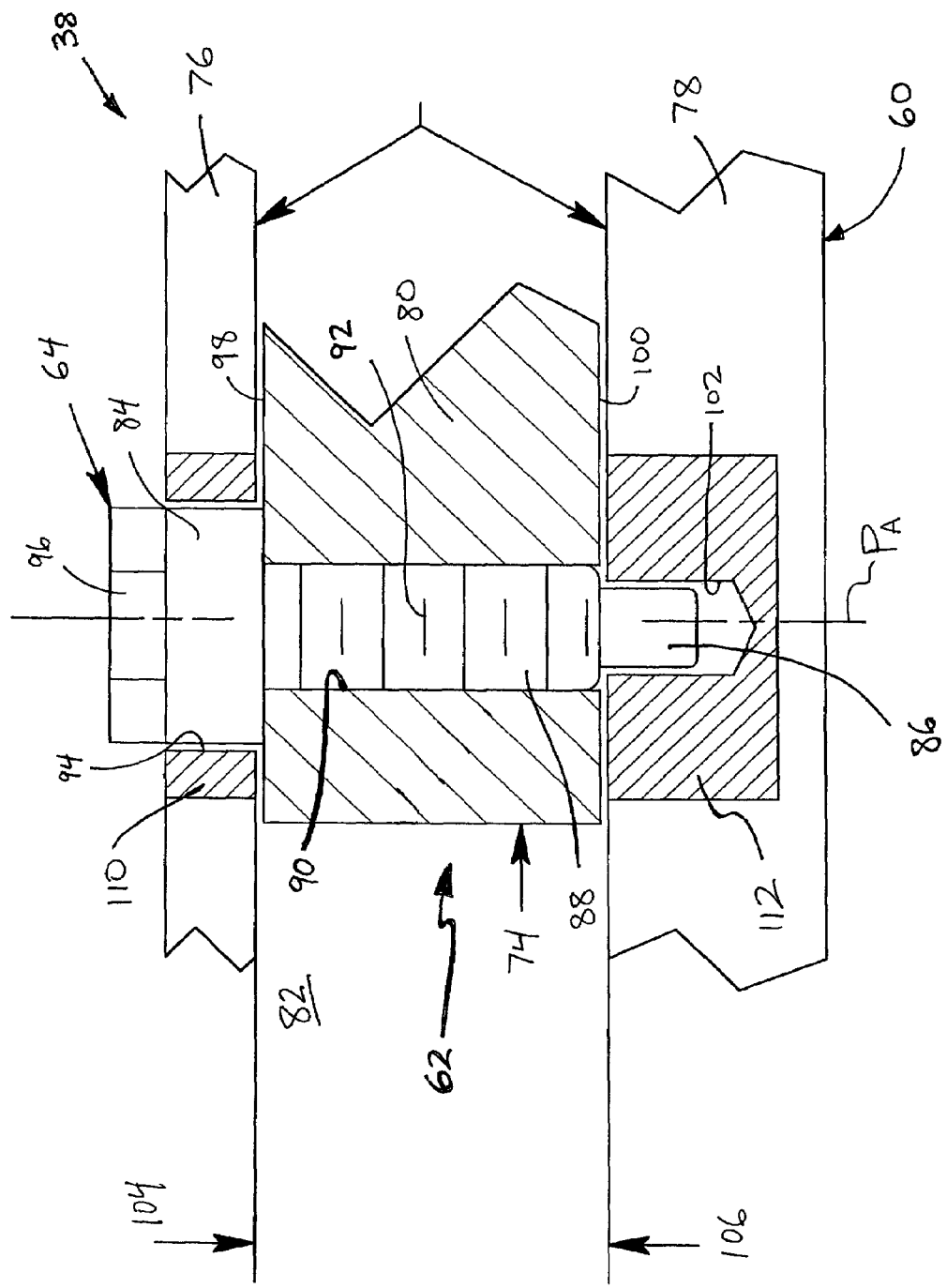
FIG. 4 is a cross-sectional view of the control lever assembly of FIG. 2 taken along the view line 4—4 of FIG. 3.

With reference to FIGS. 3 and 4, a preferred embodiment of the clutch lever assembly 38 is illustrated in greater detail. Although the clutch lever assembly 38 is shown and illustrated in detail, preferably the brake lever assembly 36 is of a substantially similar construction. Furthermore, other types of control lever assemblies, preferably also constructed in a manner similar to the clutch lever assembly 38, may also be provided.

Preferably, the clutch lever assembly 38 includes a lever support, or perch 60, and a lever 62. The perch 60 is configured to be mounted to the handlebar 32 and support the clutch lever 62 for rotation about a pivot axis $P_A$. Desirably, a pivot shaft, or bolt 64, supports the clutch lever 62 relative to the perch 60.

The lever 62 may be collapsible, in a direction away from the handlebar 32, in order to inhibit damage during a fall or crash, as described in greater detail in U.S. Pat. No. 6,393,936, the entirety of which is incorporated by reference herein and made a part of this specification. Furthermore, the perch 60 may be selectively rotatable about the handlebar axis H to inhibit damage in the event of a crash, as described in greater detail in U.S. patent application Ser. No. 10/138,933, filed May 3, 2002, the entirety of which is incorporated by reference herein and made a part of this specification.

Preferably, the perch 60 is secured to the handlebar 32 by a clamp arrangement. The illustrated perch 60 includes a main body portion 66 and a clamp plate 68. The main body 66 and the clamp plate 68 cooperate to receive the handlebar 32 therebetween. A pair of fasteners, such as bolts 70, interconnect the main body 66 and the clamp plate 68 and permit a clamp force to be applied to the handlebar 32 to secure the perch 60 in a desired rotational position about an axis H of the handlebar assembly 32.

Desirably, the clutch lever 62 is generally L-shaped and includes a finger grip portion 72, extending generally parallel to the handlebar axis H, and a mount portion 74, extending generally normal to the handlebar axis H. The finger grip portion 72 of the clutch lever 62 is positioned to be accessible to a rider of the motorcycle 10 when his or her hand is placed on the handgrip 34 (FIG. 2). The clutch lever 62 may be pulled toward the handlebar 32 to actuate a manual clutch (not shown) of the motorcycle 10.

Preferably, the main body 66 of the perch 60 includes a pair of flanges 76, 78 spaced from one another in a generally vertical direction. The flanges 76, 78 extend in a radial direction away from the handlebar axis H. The mount portion 74 of the clutch lever 62 includes an extension 80 that is sized and shaped to be received within the space 82 between the upper and lower flanges 76, 78, respectively.

With reference to FIG. 4, preferably the pivot bolt 64 includes an upper shaft portion 84, a lower shaft portion 86 and an intermediate shaft portion 88. Preferably, the intermediate shaft portion 88 extends through a threaded aperture 90 defined by the extension 80 of the mount portion 74 of the clutch lever 62. Desirably, the intermediate shaft portion 88 defines a length that is substantially equal to a thickness of the extension 80 in a direction aligned with the pivot axis $P_A$.

The intermediate shaft portion 88 preferably includes external threads 92 configured to engage the internal threads of the threaded aperture 90 and, thus, secure the pivot bolt 64 to the clutch lever 62, both rotationally and in a direction along the pivot axis $P_A$. Alternatively, the intermediate shaft portion 88 may be secured to the clutch lever 62 by other suitable arrangements. For example, but without limitation, the intermediate shaft portion 88 may be sized to be press-fit into the aperture 90, which preferably would not be threaded in such an arrangement. The intermediate shaft portion 88 could alternatively be secured with a set screw passing through the clutch lever 62 and contacting the intermediate shaft portion 88. Other suitable arrangements apparent to one of skill in the art may also be used.

The upper shaft portion 84 extends through a bore 94 defined by the upper flange 76. Desirably, the bore 94 extends completely through the upper flange 76 to permit the pivot bolt 64 to be passed through the bore 94 for assembly to the clutch lever 62. In addition, the upper shaft portion 84 extends completely through the bore 94 and includes an exposed engagement portion 96, which preferably is hex-shaped to permit the pivot bolt 64 to be assembled to the clutch lever 62 by a wrench or other suitable tool. Alternatively, the upper shaft portion 84 may be otherwise configured to permit engagement with a tool for assembly and tightening of the pivot bolt 64.

Desirably, both the upper shaft portion 84 and the bore 94 are substantially cylindrical in shape and the upper shaft portion 84 is rotatably supported by the bore 94 of the upper flange 76. Desirably, the upper shaft portion 84 defines a diameter that is greater than a diameter of the intermediate shaft portion 88. Thus, the upper shaft portion 84 contacts an upper surface 98 of the clutch lever 62 to define a fully inserted position of the pivot bolt 64 relative to the clutch lever 62.

The lower shaft portion 86 extends downwardly (relative to its orientation in FIG. 4) from the intermediate shaft portion 88 to a position below a lower surface 100 of the clutch lever 62. The lower shaft portion 86 is received within a bore 102 defined by the lower flange 78. Desirably, the bore 102 extends only partially through the lower flange 78. However, in other arrangements, the bore 102 may extend completely through the lower flange 78. Preferably, both the lower shaft portion 86 and the bore 102 are substantially cylindrical in shape and the lower shaft portion 86 is rotatably supported within the bore 102. Preferably, the diameter of the lower shaft portion 86 is less than the diameter of the intermediate shaft portion 88.

Figure 1:
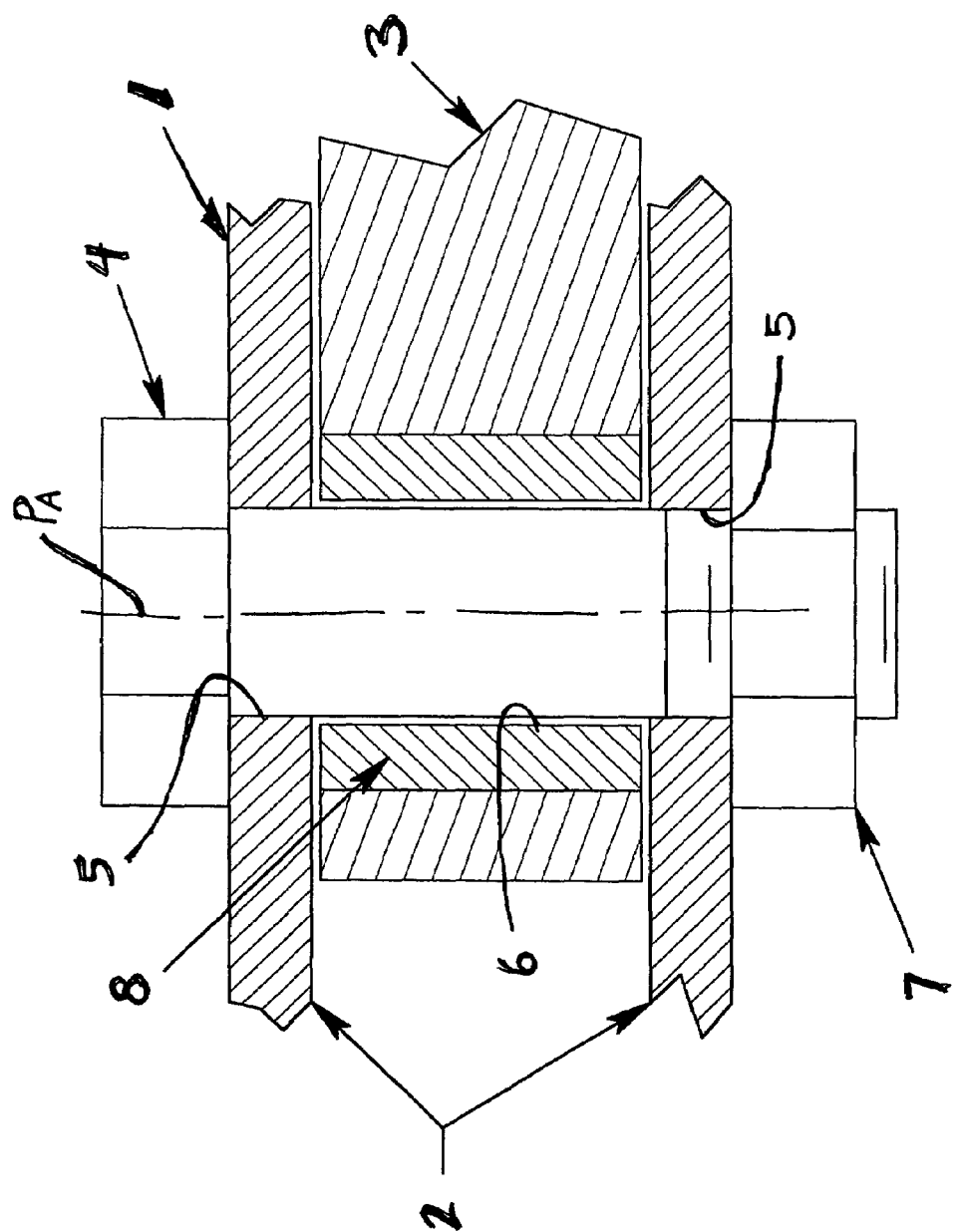
FIG. 1 is a cross-sectional view of a prior art control lever assembly.

As described above, preferably the pivot bolt 64 is fixed with respect to the control lever 62. Thus, both the pivot bolt 64 and the control lever 62 rotate relative to the upper and lower flanges 76, 78 of the perch 60 and, accordingly, the upper and lower shaft portions 84, 86 rotate along with rotation of the clutch lever 62. Accordingly, the control lever 62 is rotatably supported at at least a point, and desirably along a distance, positioned outwardly of both surfaces 104, 106 (FIG. 4) of the upper and lower flanges 76, 78, respectively, that define the space 82 between the flanges 76, 78. Thus, a distance between the uppermost and lowermost contact surfaces between the pivot bolt 64 and the perch 60 is greater than a distance between the surfaces 104 and 106. Therefore, play due to any gap that may exist between the pivot bolt 64 and the bores 94, 102 of the upper and lower flanges 76, 78, respectively, is significantly reduced in comparison to the control lever 3 of FIG. 1, which is supported only between the flanges 2.

Although the illustrated control lever assembly 38 includes a separate pivot bolt 64 assembled to the control lever 62, other arrangements are possible wherein the upper and lower shaft portions 84, 86 are monolithic with the control lever 62. In such an arrangement, one of the upper or lower flanges 76, 78 may be configured to be removable from the perch 60 to permit accessibility of the control lever 62 within the space 82. Once the control lever 62 is positioned within the space 82 adjacent the fixed flange 76 or 78, the removable flange 76 or 78 may be reassembled to the perch 60 to secure the control lever 62 in place. Other arrangements apparent to those of skill in the art may also be used.

Furthermore, in order to reduce friction and/or improved wear resistance of the control lever assembly 38, upper and lower bushings or bearing assemblies 110, 112, respectively, may be incorporated within the upper and lower flanges 76, 78 to support the upper and lower shaft portions 84, 86. In addition, although the upper and lower shaft portions 84, 86 are preferably cylindrical, other suitable shapes, which permit rotation of the control lever 62 relative to the perch 60, may also be used.

Although this invention has been disclosed in the context of a certain preferred embodiment and examples, it will be understood by those skilled in the art, that the present invention extends beyond the specifically disclosed embodiments to other alternative embodiments and/or uses of the invention and obvious modifications and equivalence thereof. In particular, while the present control lever assembly has been described in the context of a particularly preferred embodiment, the skilled artisan will appreciate, in view of the present disclosure, that certain advantages, features and aspects of the assembly may be realized in a variety of other applications, many of which have been noted above. Additionally, it is contemplated that various aspects and features of the invention described can be practiced separately, combined together, or substituted for one another, and at a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A control lever assembly, comprising:
  a control lever support configured to be connectable to a handlebar assembly of an associated vehicle, said support having an upper flange and a lower flange defining a space therebetween, said upper flange defining an upper bore and said lower flange defining a lower bore, said upper bore and said lower bore aligned with one another along a pivot axis of said control lever assembly;
  a control lever defining a finger grip portion and a mount portion, said mount portion defining an upper surface and a lower surface, a distance between said upper and lower surfaces sized such That said mount portion is receivable within said space, said control lever additionally comprising an upper shaft portion extending from said upper surface and a lower shaft extending from said lower surface, said upper shalt portion being supported within sail upper bore and said lower shaft portion being supported within said lower bore when said lever is rotatably supported by said support, wherein said upper shaft portion and said lower shaft portion are configured to rotate with said control lever relative to said control lever support, where said upper shaft portion and said lower shaft portion are removably secured to said mount portion of said control lever.

2. The control lever assembly of claim 1, additionally comprising a bearing assembly positioned between said upper shaft portion and said upper bore.

3. The control lever assembly of claim 1, additionally comprising a bearing assembly positioned between said lower shaft portion and said lower bore.

4. The control lever assembly of claim 1, wherein said upper bore extends completely through said upper flange.

5. The control lever assembly of claim 1, wherein said upper shaft portion is substantially cylindrical in shape.

6. The control lever assembly of claim 5, wherein said lower shaft portion is substantially cylindrical in shape.

7. A control lever assembly, comprising:
- a control lever support configured to be connectable to a handlebar assembly of an associated vehicle, said support having an upper flange and a lower flange defining a space therebetween, said upper flange defining an upper bore and said lower flange defining a lower bore, said upper bore and said lower bore aligned with one another along a pivot axis of said control lever assembly;
- a control lever defining a finger grip portion and a mount portion, said mount portion defining an upper surface and a lower surface, a distance between said upper and lower surfaces sized such that said mount portion is receivable within said space, said control lever additionally comprising an upper shaft portion extending from said upper surface and a lower shaft extending from said lower surface, said upper shaft portion being supported within said upper bore and said lower shaft portion being supported within said lower bore when said lever is rotatably supported by said support;
- wherein said upper bore extends completely through said upper flange and said lower bore extends only partially through said lower flange.

8. A control lever assembly, comprising:
- a control lever support configured to be connectable to a handlebar assembly of an associated vehicle, said support having an upper flange and a lower flange defining a space therebetween, said upper flange defining an upper bore and said lower flange defining a lower bore;
- a control lever defining a finger grip portion and a mount portion, said mount portion configured to be receivable within said space and defining an aperture extending therethrough;
- a pivot shaft extending through said aperture and being fixed with said control lever, said pivot shaft defining a pivot axis of said control lever and having an intermediate shaft portion, an upper shaft portion and a lower shaft portion, said intermediate shaft portion positioned within said aperture, and said upper shalt portion being supported within said upper bore and said lower shaft portion being supported within said lower bore when said control lever is supported by said support; wherein said intermediate portion of said pivot shaft defines external threads and said aperture defines internal threads, said external threads engaging said internal threads when said pivot shaft is fixed to said control lever.

9. The control lever assembly of claim 8, wherein said upper shaft portion defines a first diameter and said intermediate shaft portion defines a second diameter, said first diameter being larger than said second diameter.

10. The control lever assembly of claim 9, wherein said lower shaft portion defines a third diameter, said third diameter being smaller than said second diameter.

11. The control lever assembly of claim 8, additionally comprising a bearing assembly positioned between said upper shaft portion and said upper bore.

12. The control lever assembly of claim 8, additionally comprising a bearing assembly positioned between said lower shaft portion and said lower bore.

13. The control lever assembly of claim 8, wherein said upper bore extends completely through said upper flange.

14. The control lever assembly of claim 13, wherein said lower bore extends only partially through said lower flange.

15. The control lever assembly of claim 8, wherein said upper shaft portion is substantially cylindrical in shape.

16. The control lever assembly of claim 15, wherein said lower shaft portion is substantially cylindrical in shape.

17. A control lever assembly, comprising:
- a control lever having a finger grip portion and a mount portion, said mount portion defining a bore;
- a control lever support having a first flange and a second flange defining a space therebetween, said first flange defining a first surface and said second flange defining a second surface facing said first surface, said support configured to support said mount portion of said control lever within said space for rotation about a pivot axis;
- a support bolt defining a shaft portion, a first end and a second end, said shaft portion configured to occupy said bore when said support bolt is coupled to said control lever, said first end having a diameter greater than said shaft portion such that said first end contacts a surface of said control lever surrounding said bore;
- wherein said control lever is supported for relative rotation by said support at first and second points along said pivot axis respectively defined by said first and second ends of said support bolt, wherein a distance between said first and second points is greater than a distance between said first and second surfaces.

18. The control lever assembly of claim 17, wherein said first point is defined by said first flange and said second point is defined by said second flange.

* * * * *